(12) United States Patent
Nemoto et al.

(10) Patent No.: US 11,180,124 B2
(45) Date of Patent: Nov. 23, 2021

(54) CONTROLLER AND CONTROL METHOD

(71) Applicant: Robert Bosch GmbH, Stuttgart (DE)

(72) Inventors: Nobuho Nemoto, Kanagawa (JP);
Takuya Watanabe, Kanagawa (JP)

(73) Assignee: Robert Bosch GmbH, Stuttgart (DE)

( * ) Notice: Subject to any disclaimer, the term of this patent is extended or adjusted under 35 U.S.C. 154(b) by 726 days.

(21) Appl. No.: 16/065,311

(22) PCT Filed: Dec. 1, 2016

(86) PCT No.: PCT/IB2016/057248
§ 371 (c)(1),
(2) Date: Jun. 22, 2018

(87) PCT Pub. No.: WO2017/109614
PCT Pub. Date: Jun. 29, 2017

(65) Prior Publication Data
US 2021/0162963 A1  Jun. 3, 2021

(30) Foreign Application Priority Data

Dec. 22, 2015 (JP) .............................. JP2015-250583

(51) Int. Cl.
*B60T 8/172* (2006.01)
*B60T 8/171* (2006.01)

(52) U.S. Cl.
CPC .............. *B60T 8/172* (2013.01); *B60T 8/171* (2013.01); *B60T 2201/06* (2013.01); *B60T 2220/04* (2013.01)

(58) Field of Classification Search
CPC combination set(s) only.
See application file for complete search history.

(56) References Cited

U.S. PATENT DOCUMENTS

| | | | | |
|---|---|---|---|---|
| 5,906,559 A | * | 5/1999 | Murasugi | ................ F16H 61/20 477/93 |
| 6,039,673 A | * | 3/2000 | Mikami | .............. F16H 61/0206 477/93 |

(Continued)

FOREIGN PATENT DOCUMENTS

| | | |
|---|---|---|
| JP | 2010151193 A | 7/2010 |
| JP | 2015033903 A | 2/2015 |
| WO | 2013104641 A1 | 7/2013 |

OTHER PUBLICATIONS

International Search Report and Written Opinion for Application No. PCT/IB2016/057248 dated Mar. 7, 2017 (13 pages).

*Primary Examiner* — Jeff A Burke
*Assistant Examiner* — Madison B Emmett
(74) *Attorney, Agent, or Firm* — Michael Best & Friedrich LLP

(57) ABSTRACT

A controller and a control method to a vehicle, the controller and the control method executing brake control in which primary information is selectively supplemented by secondary information that is information on an assumed state related to connection and disconnection of a clutch. The controller includes a determination section that determines whether an actual state and the assumed state, which are related to the connection and the disconnection of the clutch, match each other in accordance with a temporal change in the secondary information; and a brake control section that executes the brake control by using the primary information but not the secondary information in the case where the determination section determines that the actual state and the assumed state do not match each other.

5 Claims, 6 Drawing Sheets

(56) References Cited

U.S. PATENT DOCUMENTS

| | | | | |
|---|---|---|---|---|
| 8,412,436 B2* | 4/2013 | Mallet | ............ | B60T 7/122 |
| | | | | 701/83 |
| 2010/0185355 A1* | 7/2010 | Desfriches | ............ | F16D 48/06 |
| | | | | 701/31.4 |
| 2010/0198470 A1* | 8/2010 | Week | ............ | F16D 48/06 |
| | | | | 701/67 |
| 2015/0031504 A1* | 1/2015 | Reynolds | ............ | B60W 10/06 |
| | | | | 477/93 |
| 2015/0142286 A1* | 5/2015 | Waku | ............ | B60T 17/22 |
| | | | | 701/70 |
| 2015/0175137 A1* | 6/2015 | Murata | ............ | B60T 7/107 |
| | | | | 701/70 |
| 2017/0113693 A1* | 4/2017 | Bularz | ............ | B60W 10/06 |

* cited by examiner

CONTROLLER AND CONTROL METHOD

BACKGROUND OF THE INVENTION

The invention relates to a controller and a control method for executing break control of a vehicle.

In general, a clutch operation section, such as a clutch pedal, of a vehicle includes a sensor for detecting an operation state of a clutch. This sensor is used to acquire information on an assumed state related to connection and disconnection of the clutch. In brake control of the vehicle, the information on the assumed state is possibly used with primary information only when reliability of the information on the assumed state is high. The reliability of the information on the assumed state can be determined by monitoring motion of an input shaft and motion of an output shaft of the clutch (for example, see PTL 1).

CITATION LIST

Patent Literature

PTL1: JP-A-2010-151193

SUMMARY OF INVENTION

In order to evaluate the reliability of the information on the assumed state related to the connection and the disconnection of the clutch by monitoring the motion of the input shaft and the motion of the output shaft of the clutch, attachment of the sensor to the inside of the vehicle, a design change in the clutch or a peripheral member thereof, and the like occur. Asa result, extensive work is generated to realize or add the above-described brake control. In particular, acquisition of the information on the assumed state related to the connection and the disconnection of the clutch and the evaluation of the reliability thereof are conducted to supplement the brake control that uses the primary information. Thus, it is further desired that those do not generate the extensive work.

The invention has been made with a problem as described above as the background and therefore has a purpose of improving applicability of a controller and a control method to a vehicle, the controller and the control method executing brake control in which primary information is selectively supplemented by secondary information that is information on an assumed state related to connection and disconnection of a clutch.

A controller according to the invention is a controller for executing brake control that is executed on the basis of primary information and secondary information that is selectively defined whether to be used with the primary information and indicates an assumed state related to connection and disconnection of a clutch in a vehicle. The controller includes: a determination section that determines whether an actual state and the assumed state, which are related to the connection and the disconnection of the clutch, match each other in accordance with a temporal change in the secondary information; and a brake control section that executes the brake control by using the primary information but not the secondary information in the case where the determination section determines that the actual state and the assumed state do not match each other.

A control method according to the invention is a brake control method for executing brake control that is executed on the basis of primary information and secondary information that is selectively defined whether to be used with the primary information and indicates an assumed state related to connection and disconnection of a clutch in a vehicle. The control method includes the steps of: determining whether an actual state and the assumed state, which are related to the connection and the disconnection of the clutch, match each other in accordance with a temporal change in the secondary information; and executing the brake control by using the primary information but not the secondary information in the case where it is determined that the actual state and the assumed state do not match each other.

In the controller and the control method according to the invention, reliability of the information on the assumed state related to the connection and the disconnection of the clutch is evaluated in accordance with the temporal change in the information indicative of the assumed state related to the connection and the disconnection of the clutch in the vehicle. The evaluation of the reliability of the information on the assumed state related to the connection and the disconnection of the clutch can also be realized by a method other than a method for monitoring motion of an input shaft and motion an output shaft of the clutch. Therefore, applicability of the controller and the control method to the vehicle is improved, the controller and the control method executing the brake control in which the primary information is selectively supplemented by the secondary information that is the information on the assumed state related to the connection and the disconnection of the clutch.

DESCRIPTION OF EMBODIMENT

A description will hereinafter be made on a controller and a control method according to the invention by using the drawings. Each of a configuration, an operation, and the like, which will be described below, is merely one example, and each of the controller and the control method according to the invention is not limited to a case with such a configuration, such an operation, and the like.

In addition, in each of the drawings, detailed portions are depicted in an appropriately simplified manner or are not depicted. Furthermore, overlapping descriptions are appropriately simplified or are not made.

Embodiment

<Overall Configuration of a Vehicle Control System 200>

Figure 1:
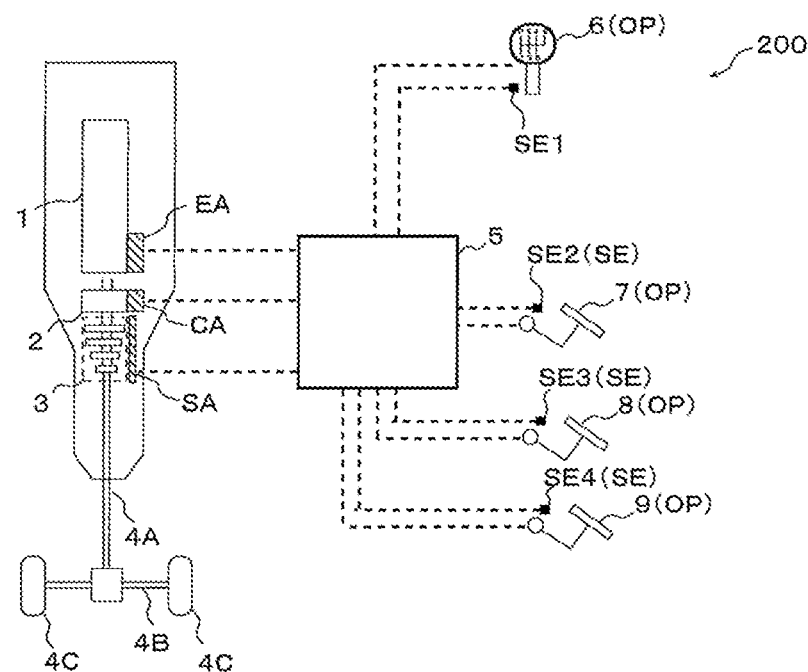
FIG. 1 A schematic configuration diagram of a vehicle control system that includes a controller according to an embodiment of the invention.
Figure 2:
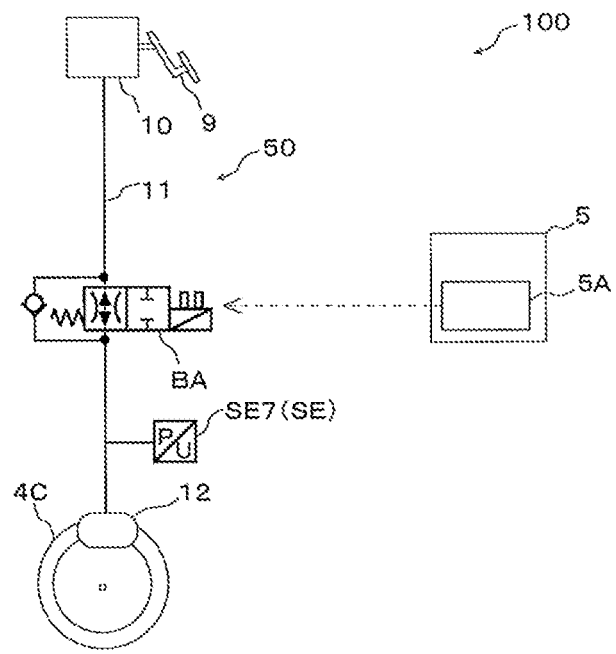
FIG. 2 A schematic configuration diagram of a hydraulic pressure control system in the vehicle control system that includes the controller according to the embodiment of the invention.

FIG. 1 is a schematic configuration diagram of a vehicle control system 200 that includes a controller 100 according to this embodiment. FIG. 2 is a schematic configuration diagram of a hydraulic pressure control system 50 in the vehicle control system 200 that includes the controller 100 according to this embodiment.

The vehicle control system 200 includes the controller 100 that is mounted in a vehicle such as an automobile, a truck, or a motorcycle, for example. In this embodiment, a description will be made on a case where the vehicle is a four-wheeled vehicle as an example. The vehicle includes, for example, a propeller shaft 4A that is connected to a transmission 3, a driveshaft 4B to which rotary power is transmitted from the propeller shaft 4A, and wheels 4C that are connected to the driveshaft 4B.

The vehicle control system 200 includes: an engine 1 that generates power; a clutch 2 that switches between a state of transmitting the power generated in the engine 1 to the transmission 3 (a connected state) and a state of not transmitting the power (a disconnected state); the transmission 3 that includes plural gears; and the hydraulic pressure control system 50 that generates a brake force.

The vehicle control system 200 also includes: a power unit EA that is used for motion of the engine 1; a clutch actuator CA that is used for motion of the clutch 2; a shift actuator SA that is used for motion of the transmission 3; and a brake actuator BA that is used to control a hydraulic pressure of a hydraulic circuit in the hydraulic pressure control system 50.

The power unit EA includes a configuration of operating the engine 1 that includes a fuel igniter, a fuel injection valve, a throttle valve, and the like, for example. Switching between the connection and the disconnection of the clutch 2 is controlled when motion of the clutch actuator CA is controlled. Gear changing of the transmission 3 is controlled when motion of the shift actuator SA is controlled. A hydraulic pressure of a wheel cylinder 12 that is provided in the wheel 4C is controlled when the brake actuator BA is opened or closed. Note that the brake actuator BA is an electromagnetic valve that includes a solenoid, for example.

The vehicle control system 200 further includes an operation section OP that is operated by an occupant or the like. The operation section OP includes: a shift change lever 6 that is operated when the gear of the transmission 3 is changed; a clutch pedal 7 that is operated when the clutch 2 is switched between the connection and the disconnection; an accelerator pedal 8 that is operated when the engine 1 is driven; and a brake pedal 9 that is operated when the brake force is generated in the vehicle.

Moreover, the vehicle control system 200 includes the hydraulic pressure control system 50 depicted in FIG. 2. Note that the hydraulic circuit in the hydraulic pressure control system 50 is depicted in a simplified manner in FIG. 2. The hydraulic pressure control system 50 includes: a brake device 10 that is constructed of a booster, a master cylinder, and the like; a fluid pipe 11 that is connected to the master cylinder of the brake device 10; the brake actuator BA that is connected to the fluid pipe 11; the brake actuator BA that is connected to the fluid pipe 11; and the wheel cylinder 12 that is connected to the fluid pipe 11 and is attached to the wheel 4C. Note that the brake pedal 9 is coupled to the booster of the brake device 10.

The vehicle control system 200 includes a control section 5 that controls the power unit EA, the clutch actuator CA, the shift actuator SA, and the brake actuator BA.

The vehicle control system 200 further includes a detection mechanism SE that includes a detection switch for detecting motion (a position) of the operation section OP, and the like. As depicted in FIG. 1, the detection mechanism SE includes: a position detection sensor SE1 that detects a position of the shift change lever 6; a position detection sensor SE2 that detects a position of the clutch pedal 7; a position detection sensor SE3 that detects a position of the accelerator pedal 8; a position detection sensor SE4 that detects a position of the brake pedal 9; and a pressure sensor SE7 that detects the hydraulic pressure of the wheel cylinder 12.

The detection mechanism SE also includes: an acceleration sensor SE5 (see FIG. 3) that is used to compute acceleration of the vehicle; and a wheel speed sensor SE6 (see FIG. 3) that is used to compute a wheel speed of the vehicle.

<Description on a Configuration of the Controller 100>

Figure 3:
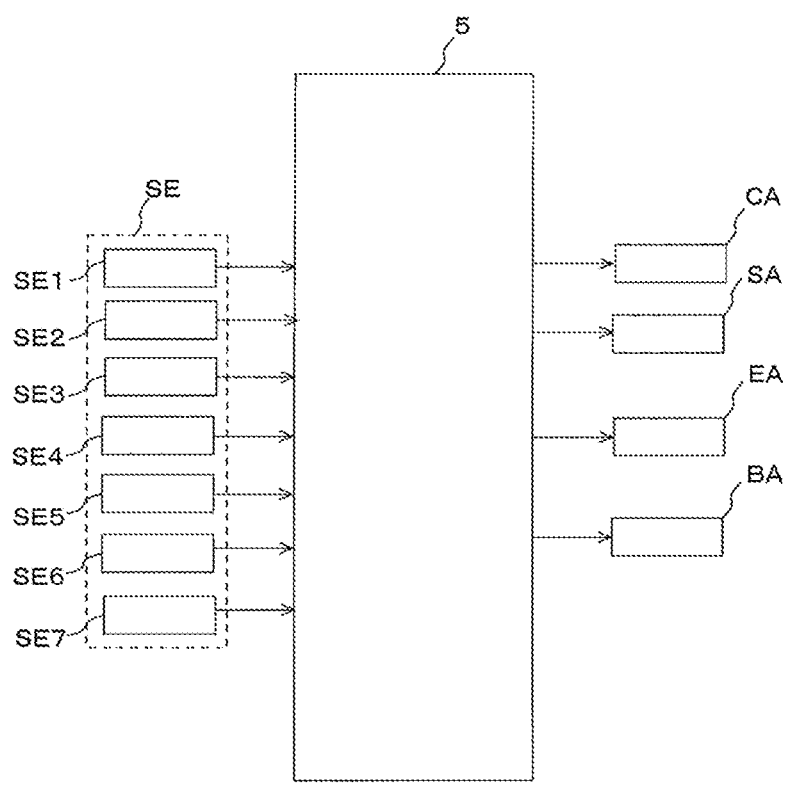
FIG. 3 A functional block diagram of various sensors, a control section, and various actuators provided in the vehicle control system that includes the controller according to the embodiment of the invention.
Figure 4:
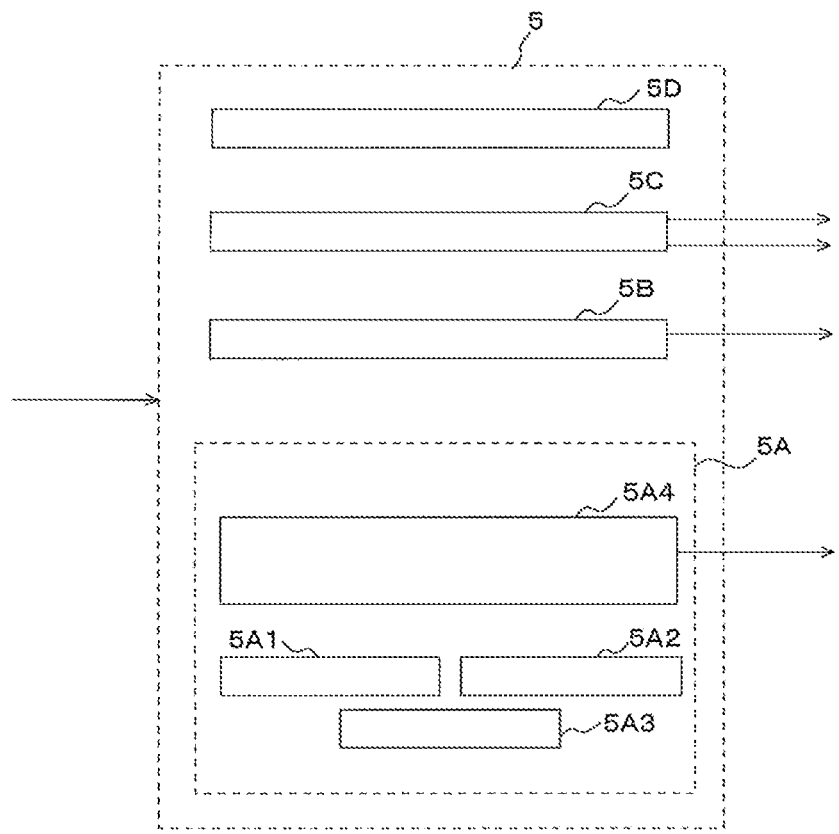
FIG. 4 A functional block diagram of the control section of the controller according to the embodiment of the invention.

FIG. 3 is a functional block diagram of the various sensors, the control section 5, and the various actuators provided in the vehicle control system 200 that includes the controller 100 according to this embodiment. FIG. 4 is a functional block diagram of the control section 5 of the controller 100 according to this embodiment. A description will be made on a configuration example of the control section 5 with reference to FIG. 3 and FIG. 4.

The controller 100 at least includes the hydraulic pressure control system 50 and a brake control section 5A of the control section 5, which will be described below. Note that the controller 100 may include the detection mechanism SE and the like.

The control section 5 includes: the brake control section 5A that controls the brake actuator BA on the basis of a detection signal of the detection mechanism SE; an engine control section 5B that controls the power unit EA in accordance with a depression amount of the accelerator pedal 8 that corresponds to a detection signal of the position detection sensor SE3; a transmission control section 5C that controls the clutch actuator CA and the shift actuator SA on the basis of the detection signal of the detection mechanism SE; and a memory section 5D that stores various types of information. Note that the memory section 5D can be constructed of a random access memory (a RAM) and the like, for example. The memory section 5D stores information on a detection signal of the position detection sensor SE2 that serves as secondary information, for example.

A part or a whole of the control section 5 may be constructed of a microcomputer, a microprocessor unit, or the like, may be constructed of a member in which firmware and the like can be updated, or may be a program module or the like that is executed by a command from a CPU or the like, for example.

The brake control section 5A includes a determination section 5A1 that makes a determination on whether the clutch 2 is connected, and the like; a timer section 5A2 that counts time; and a computation section 5A3 that computes a vehicle speed from the wheel speed sensor SE6, and the like. The brake control section 5A also includes a brake control section 5A4 that controls the brake actuator BA.

The brake control section 5A executes brake control that is executed on the basis of primary information and the secondary information that is selectively defined whether to be used with the primary information and that indicates an assumed state related to the connection and the disconnection of the clutch 2 in the vehicle. The determination section 5A1 determines whether an actual state and the assumed state, which are related to the connection and the disconnection of the clutch 2, match each other in accordance with a temporal change in the secondary information.

Here, the primary information is information that is output through an operation of the accelerator pedal 8 and is processed by the determination section 5A1, for example. Information on the position detection sensor SE3, which is provided on the accelerator pedal 8, corresponds to the primary information. The secondary information is information indicative of the connected state of the clutch 2, for example. Information on the position detection sensor SE2, which is provided on the clutch pedal 7, corresponds to the secondary information.

First, a determination that is made by the determination section 5A1 and that corresponds to a relationship will be described.

The determination section 5A1 determines whether the disconnected state of the clutch 2 continues for a prescribed time on the basis of a detection signal of the position detection sensor SE2, which is provided on the clutch 2, and output of the timer section 5A2. Based on this determination result, the determination section 5A1 determines whether the assumed state related to the connection and the disconnection of the clutch 2 matches the actual state related to the connection and the disconnection of the clutch 2. Note that the assumed state indicates the connected state of the clutch 2 that is estimated on the basis of the detection signal of the detection mechanism SE. Meanwhile, the actual state does not indicate the state that is estimated on the basis of the detection signal of the detection mechanism SE but indicates the actually connected state of the clutch 2.

A situation where the disconnected state of the clutch 2 continues for the prescribed time corresponds to a situation where the clutch pedal 7 keeps being operated for the prescribed time. Here, the situation where the clutch pedal 7 keeps being operated for the prescribed time is unlikely to be assumed due to a burden on the occupant. Thus, even when the occupant does not operate the clutch pedal 7 in reality, the detection signal of the position detection sensor SE2 possibly indicates that the clutch pedal 7 is operated.

Here, compared to a detection signal of another position detection sensor or the like, for example, the detection signal of the position detection sensor SE2, which is used for the determination on whether the clutch 2 is connected, is often low in reliability. It is because, although the depression amount of the clutch pedal 7 at a time when the clutch 2 is actually connected is possibly changed due to wear of the clutch 2, a relationship between the depression amount of the clutch pedal 7 and a sensed position by the position detection sensor SE2 is not changed, or the like, for example.

Thus, when the disconnected state of the clutch 2 continues for the prescribed time, the determination section 5A1 determines that the assumed state and the actual state do not match each other. In addition, due to the low reliability of the information on the operation state of the clutch 2, the determination section 5A1 sets a flag F. When the flag F is set, the secondary information is not used in the brake control.

The determination section 5A1 determines whether the detection signal of the position detection sensor SE2 keeps chattering during a prescribed cycle T on the basis of the detection signal of the position detection sensor SE2, which is provided on the clutch 2, and the output of the timer section 5A2. Here, chattering means that an unstable signal is output from a detection switch that constitutes the position detection sensor SE2 or the like. With said determination, the determination section 5A1 can also determine whether the assumed state related to the connection and the disconnection of the clutch 2 matches the actual state related to the connection and the disconnection of the clutch 2.

When the detection signal of the position detection sensor SE2 chatters, a potential indicating that the clutch 2 is connected and a potential indicating that the clutch 2 is disconnected are switched in an extremely short time, such as 0.1 second or shorter. It is difficult for the occupant to operate the clutch pedal 7 and intentionally generate a chattering signal just as described. Thus, when the detection signal of the position detection sensor SE2 chatters, the determination section 5A1 also determines that the assumed state and the actual state do not match each other, and sets the flag F.

Note that the control section 5 may include a learning function. For example, the determination section 5A1 may determine whether the actual state and the assumed state match each other by taking an aggregate result of the detection signals of the position detection sensor SE2 as the secondary information into consideration. This is because a time during which the clutch 2 keeps being disconnected possibly differs by the occupants, and also because the time during which chattering continuously occurs possibly differs by the vehicles, for example.

The control section 5 executes hill-hold control as the brake control under a certain condition. The hill-hold control refers to control in which the brake force of the vehicle is retained for a certain time even when the occupant of the vehicle releases the brake pedal 9 in a state where the vehicle is stopped on an inclined road surface. Here, the hill-hold control includes a retention mode and a cancellation mode. The retention mode is a mode in which the brake force of the vehicle is retained. The cancellation mode is a mode in which the retention of the brake force in the retention mode is cancelled and the brake force is reduced. Thus, timing at which the brake force, which has been retained in the hill-hold control, starts to be reduced is transition timing from the retention mode to the cancellation mode.

The hill-hold control as the brake control is executed on the basis of the primary information and the secondary information that is selectively defined whether to be used with the primary information and that indicates the assumed state related to the connection and the disconnection of the clutch 2 in the vehicle. In the hill-hold control, whether to use the secondary information is defined in accordance with whether the flag F is set.

The determination section 5A1 determines whether an inclination value of the road surface that is computed by the computation section 5A3 is larger than a prescribed value, also determines whether the vehicle is stopped, and further determines whether the brake pedal 9 is released. When determining that the inclination value of the road surface that is computed by the computation section 5A3 is larger than the prescribed value, also determining that the vehicle is stopped, and further determining that the brake pedal 9 is released, the determination section 5A1 determines to execute the retention mode of the hill-hold control. Here, the inclination value of the road surface can be computed on the basis of a detection signal of the acceleration sensor SE5, a detection signal of the wheel speed sensor SE6 can be used for the vehicle speed, and a detection signal of the position detection sensor SE4 can be used for an operation state of the brake pedal 9.

In the case where the retention mode is executed, the determination section 5A1 determines whether the accelerator pedal 8 is operated, determines whether the above-described flag F is set, and further determines whether the clutch pedal 7 is operated. In this way, it is determined whether to shift to the cancellation mode even before a certain period elapses from the initiation of the retention mode.

In the case where the cancellation mode is executed, the determination section 5A1 determines whether the pressure of the wheel cylinder 12 that is computed by the computation section 5A3 is lower than a prescribed pressure. Said determination is used to acquire timing at which the cancellation mode is terminated.

The timer section 5A2 counts a period from the initiation of the retention mode until a lapse of the certain time, a period from time, at which it is determined that the clutch 2 is disconnected on the basis of the detection signal of the position detection sensor SE2, until a lapse of a prescribed time, a period from time at which the detection signal of the position detection sensor SE2 starts chattering until a lapse of the prescribed cycle T, and the like, for example.

The computation section 5A3 computes the wheel speed on the basis of the detection signal of the wheel speed sensor SE6. The computation section 5A3 also computes the inclination value of the road surface on the basis of the detection signal of the acceleration sensor SE5. The computation section 5A3 further computes the pressure of the wheel cylinder 12 on the basis of a detection signal of the pressure sensor SE7.

The brake control section 5A4 controls opening and closing operations of the brake actuator BA, and the like.
<About the Chattering Signal>

Figure 5:
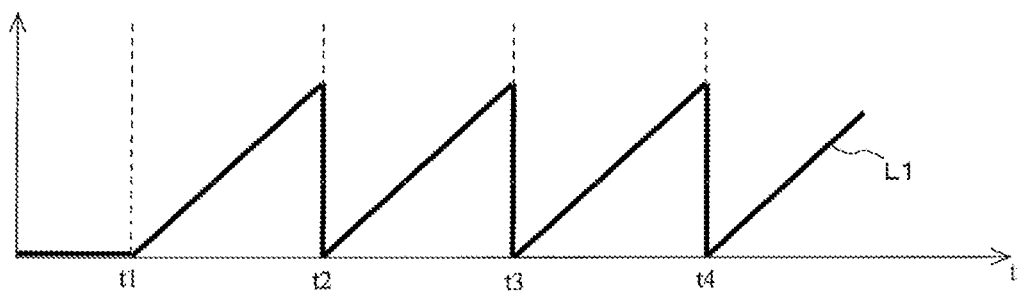
FIG. 5 Voltage fluctuations at a time when a detection signal of a position detection sensor as secondary information chatters.
Figure 6:
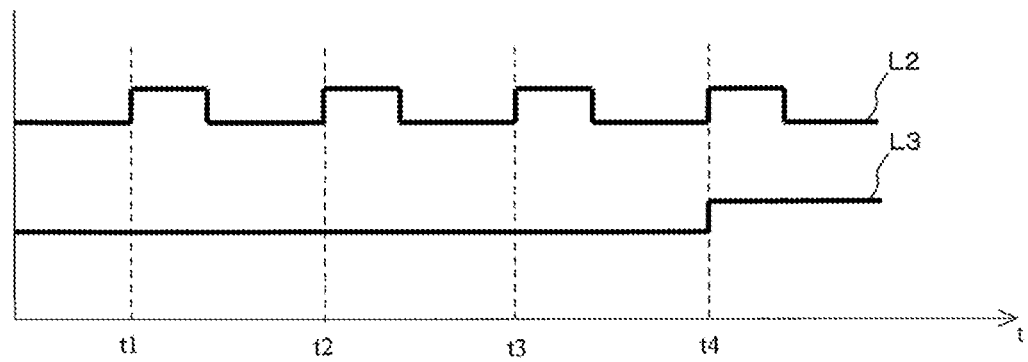
FIG. 6 Timing of a connection determination and a disconnection determination of a clutch as well as timing of a chattering determination of the detection signal of the position detection sensor.
Figure 7:
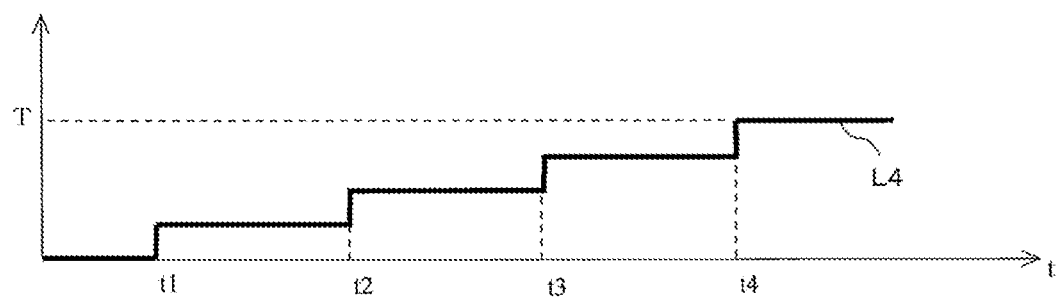
FIG. 7 A total cycle from time at which the detection signal of the position detection sensor starts chattering.

FIG. 5 depicts voltage fluctuations at a time when the detection signal of the position detection sensor SE2 as the secondary information chatters. FIG. 6 depicts timing of a connection determination and a disconnection determination of the clutch 2 as well as timing of a chattering determination of the detection signal of the position detection sensor SE2. FIG. 7 depicts a total cycle from time at which the detection signal of the position detection sensor SE2 starts chattering.

A line L1 depicted in FIG. 5 indicates a voltage of the detection signal of the position detection sensor SE2. A vertical axis of FIG. 5 indicates the voltage while a horizontal axis thereof indicates time. Note that, in FIG. 5 to FIG. 7, the detection signal of the position detection sensor SE2 has one cycle in a period from time t1 to time t2, one cycle in a period from the time t2 to time t3, and one cycle in a period from the time t3 to time t4. A time of the one cycle is 0.1 second or shorter, for example. When the detection signal of the position detection sensor SE2 chatters, as depicted in FIG. 5, the voltage is periodically boosted and lowered in an extremely short time.

A line L2 depicted in FIG. 6 indicates the timing of the connection determination and the disconnection determination of the clutch 2. When the line L2 rises, the control section 5 determines that the clutch 2 is in the connected state. When the line L2 drops, the control section 5 determines that the clutch 2 is in the disconnected state. When the detection signal of the position detection sensor SE2 chatters, as depicted in FIG. 6, the connection determination and the disconnection determination of the clutch 2 are switched. Because it is difficult to create such a situation through the operation of the clutch pedal 7 by the occupant, the detection signal of the position detection sensor SE2 as the secondary information is regarded to be low in reliability, and the secondary information is not used in the predetermined brake control.

A line L3 depicted in FIG. 6 indicates the timing of the chattering determination of the detection signal of the position detection sensor SE2. A line L4 depicted in FIG. 7 indicates that the total cycle from the initiation of chattering reaches the prescribed cycle T. The line L3 rises at timing at which the line L4 reaches T. This timing means timing at which the control section 5 determines that the detection signal of the position detection sensor SE2 chatters.
<Control Flow Example of the Reliability Evaluation of the Secondary Information>

Figure 8:
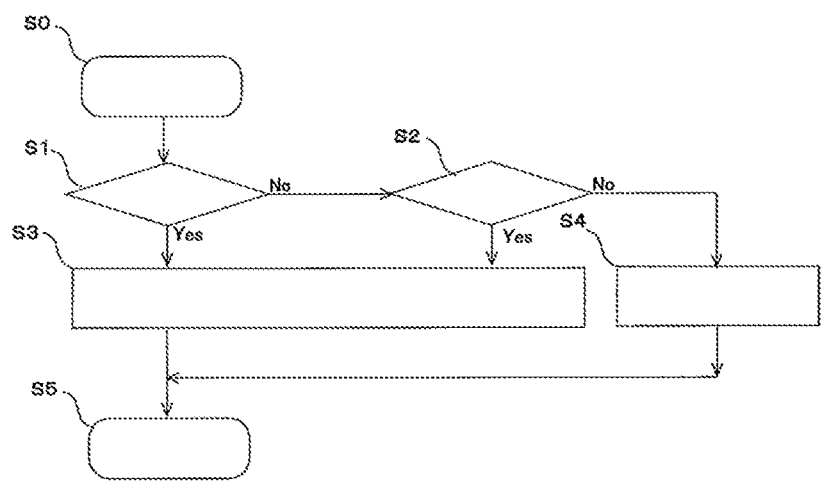
FIG. 8 One example of a flowchart for evaluating reliability of the secondary information (a determination result of a connected state of the clutch) by the controller according to the embodiment of the invention.

FIG. 8 is one example of a control flow for evaluating the reliability of the secondary information (the determination result of the connected state of the clutch 2) by the controller 100 according to this embodiment.
(Step S0: Start)

The control section 5 executes the control flow for evaluating the reliability of the secondary information.
(Step S1: Determination on Disconnection of Clutch 2)

The determination section 5A1 of the control section 5 determines whether the disconnected state of the clutch 2 continues for the prescribed time on the basis of the detection signal of the position detection sensor SE2 as the secondary information and the output of the timer section 5A2.

If it is determined that the clutch 2 keeps being disconnected for the prescribed time, the process proceeds to step S3.

If it is not determined that the clutch 2 keeps being disconnected for the prescribed time, the process proceeds to step S2.
(Step S2: Determination on Chattering)

The determination section 5A1 of the control section 5 determines whether the detection signal of the position detection sensor SE2 keeps chattering during the prescribed cycle T on the basis of the detection signal of the position detection sensor SE2 as the secondary information and the output of the timer section 5A2.

If it is determined that the determination signal keeps chattering during the prescribed cycle T, the process proceeds to step S3.

If it is not determined that the determination signal keeps chattering during the prescribed cycle T, the process proceeds to step S4.
(Step S3: Set Flag F)

When the process proceeds to step S3, the actual state and the assumed state of the clutch 2 do not match each other, and the reliability of the secondary information is low. Thus, the control section 5 sets the flag F.
(Step S4: Do Not Set Flag F)

The control section 5 does not set the flag F.
(Step S5: End)

The control section 5 terminates the control flow for evaluating the reliability of the secondary information.
<Control Flow Example of the Brake Control by the Control Section 5>

Figure 9:
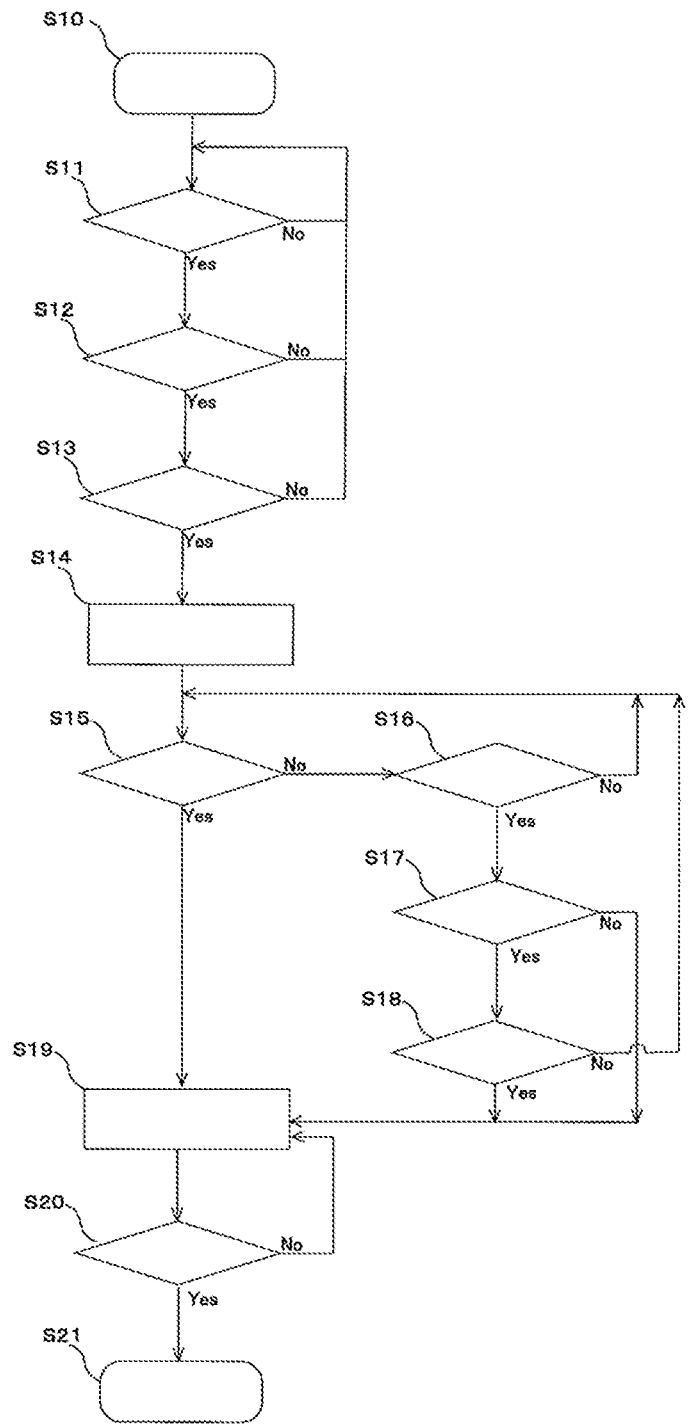
FIG. 9 One example of a control flow of brake control by the controller according to the embodiment of the invention.

FIG. 9 is one example of a control flow of the brake control by the controller 100 according to this embodiment. A description will be made on the hill-hold control that is executed by the control section 5 of the controller 100 with reference to FIG. 9.

(Step S10: Start)

The control section 5 executes the control flow that includes the hill-hold control.

(Step S11: Determination on Inclination)

The determination section 5A1 of the control section 5 determines whether the vehicle is on the inclined road surface on the basis of the inclination value that is computed by the computation section 5A3 from the detection signal of the acceleration sensor SE5.

If it is determined that the vehicle is on the inclined road surface, the process proceeds to step S12.

If it is determined that the vehicle is not on the inclined road surface, step S11 is repeated.

(Step S12: Determination on Stop of Vehicle)

The determination section 5A1 of the control section 5 determines whether the vehicle is stopped on the basis of the wheel speed that is computed by the computation section 5A3.

If it is determined that the vehicle is stopped, the process proceeds to step S13.

If it is determined that the vehicle is not stopped, the process returns to step S11.

(Step S13: Determination on Brake Pedal 9)

The determination section 5A1 of the control section 5 determines whether the brake pedal 9 is released on the basis of the detection signal of the position detection sensor SE4.

If it is determined that the brake pedal 9 is released, the process proceeds to step S14.

If it is determined that the brake pedal 9 is not released, the process returns to step S11.

(Step S14: Execution of Retention Mode of Hill-Hold Control)

The control section 5 executes the retention mode of the hill-hold control. The control section 5 closes the brake actuator BA for a certain time so as to retain the brake force of the vehicle.

(Step S15: Determination on Time Since Initiation of Retention Mode)

The determination section 5A1 of the control section 5 determines whether the certain time has elapsed since the initiation of the retention mode on the basis of the signal from the timer section 5A2.

If it is determined that the certain time has elapsed, the process proceeds to step S19.

If it is not determined that the certain time has elapsed, the process proceeds to step S16.

(Step S16: Determination on Accelerator Pedal 8)

The determination section 5A1 of the control section 5 determines whether the accelerator pedal 8 is depressed on the basis of the detection signal of the position detection sensor SE3 as the primary information.

If it is determined that the accelerator pedal 8 is depressed, the process proceeds to step S17.

If it is not determined that the accelerator pedal 8 is depressed, the process returns to step S15.

(Step S17: Determination on Flag F)

The determination section 5A1 of the control section 5 determines whether the flag F is unset.

If it is determined that the flag F is unset, the detection signal of the position detection sensor SE2 as the secondary information is reliable. Thus, the process proceeds to step S18.

If it is not determined that the flag F is unset, the detection signal of the position detection sensor SE2 as the secondary information is low in reliability. Thus, the process proceeds to step S19. That is, regardless of the detection signal of the position detection sensor SE2, the process proceeds to step S19, and the control section 5 executes the cancellation mode.

(Step S18: Determination on Clutch Pedal 7)

The determination section 5A1 of the control section 5 determines whether the clutch pedal 7 is depressed on the basis of the detection signal of the position detection sensor SE2 as the secondary information.

If it is determined that the clutch pedal 7 is depressed, the process proceeds to step S19.

If it is not determined that the clutch pedal 7 is depressed, the process returns to step S15.

(Step S19: Execution of Cancellation Mode of Hill-Hold Control)

The control section 5 executes the cancellation mode of the hill-hold control. In addition, the brake control section 5A4 of the control section 5 controls the brake actuator BA so as to reduce the brake force.

(Step S20: Determination on Cylinder Pressure)

The determination section 5A1 of the control section 5 determines whether the pressure of the wheel cylinder 12 is lower than the prescribed pressure.

If it is determined that the pressure is lower than the prescribed pressure, the process proceeds to step S21.

If it is determined that the pressure is not lower than the prescribed pressure, the process returns to step S19.

(Step S21: End)

The control section 5 terminates the control flow that includes the hill-hold control.

<Effects that the Controller 100 According to this Embodiment has>

The controller 100 according to this embodiment includes: the determination section 5A1 that determines whether the actual state and the assumed state, which are related to the connection and the disconnection of the clutch 2, match each other in accordance with the temporal change in the secondary information; and the brake control section 5A4 that executes the brake control by using the primary information but not the secondary information in the case where the determination section 5A1 determines that the actual state and the assumed state do not match each other. The secondary information that is used at the time when it is determined whether the actual state and the assumed state match each other is not limited to information from a sensor for detecting rotation of the input shaft and the output shaft of the clutch 2, or the like as in the conventional controller. Thus, applicability of the controller to the vehicle is improved.

For example, when the secondary information indicates that the disconnected state of the clutch 2 continues for the prescribed time, the determination section 5A1 determines that the actual state and the assumed state do not match each other. In addition, for example, when the secondary information indicates that chattering of the clutch 2 continuously occurs during the prescribed cycle T, the determination section 5A1 determines that the actual state and the assumed state do not match each other.

The information indicative of the connected state or the disconnected state of the clutch 2 is relatively low in reliability and possibly indicates the output that cannot be considered to be generated through the operation by the occupant. The control section 5 determines that the actual state and the assumed state do not match each other by using this and can thereby evaluate the reliability of the secondary information with high accuracy.

Preferably, the determination section 5A1 determines whether the assumed state and the actual state match each other by taking the aggregate result of the secondary information into consideration. In this way, the evaluation accuracy of the reliability of the secondary information can further be improved.

Preferably, the primer information is information that is output through an operation of an accelerator (for example, corresponding to the accelerator pedal 8) and processed by the determination section 5A1 (for example, corresponding to the detection signal of the position detection sensor SE3), and the brake control is control in which a hill-hold function for retaining the brake force generated in the vehicle on the inclined road surface is canceled (corresponding to step S19 in FIG. 9). In other words, when the determination section 5A1 determines that the actual state and the assumed state do not match each other, the hill-hold function is canceled by using the primary information, which corresponds to the detection signal of the position detection sensor SE3 provided on the accelerator pedal 8, but not the secondary information.

For example, there is a case where the actual state indicates the connection of the clutch 2 but the assumed state indicates the disconnection of the clutch 2 when the occupant operates the clutch pedal 7. If step S17 depicted in FIG. 9 is not provided, the occupant operates the clutch pedal 7, and the process proceeds from step S16 to step S18. At this time, the assumed state of the clutch 2 is the disconnected state. Thus, despite a fact that the clutch 2 is actually connected, the process returns from step S18 to step S15. Then, a loop from step S15 to step S18 cannot be broken until the certain time elapses in step S15, and the occupant cannot start the vehicle smoothly. However, the controller 100 according to this embodiment sets the flag F when determining that the actual state and the assumed state do not match each other, and thus can refrain from use of the secondary information in advance. For this reason, the process can proceed from step S17 to step S19 even before the certain time elapses in step S15. Therefore, the occupant can start the vehicle smoothly.

REFERENCE SIGNS LIST

1: Engine
2: Clutch
3: Transmission
4A: Propeller shaft
4B: Driveshaft
4C: Wheel
5: Control section
5A: Brake control section
5A1: Determination section
5A2: Timer section
5A3: Computation section
5A4: Brake control section
5B: Engine control section
5C: Transmission control section
5D: Memory section
6: Shift change lever
7: Clutch pedal
8: Accelerator pedal
9: Brake pedal
10: Brake device
11: Fluid pipe
12: Wheel cylinder
50: Hydraulic pressure control system
100: Controller
200: Vehicle control system BA: Brake actuator
CA: Clutch actuator
EA: Power unit
OP: Operation section
SA: Shift actuator
SE: Detection mechanism
SE1 to SE4: Position detection sensor
SE5: Acceleration sensor
SE6: Wheel speed sensor
SE7: Pressure sensor

The invention claimed is:

1. A control system comprising:
a first sensor;
a second sensor; and
an electronic controller connected to the first sensor and the second sensor and for executing brake control for a vehicle, the electronic controller being configured to:
receive primary information from the first sensor, the primary information relating to an operation of an accelerator of the vehicle;
receive secondary information from the second sensor, the secondary information indicating an assumed state related to connection and disconnection of a clutch in the vehicle;
determine whether an actual state, which is related to the connection and the disconnection of the clutch, and the assumed state match each other in accordance with a temporal change in the secondary information;
cancel a hill-hold function for retaining a brake force generated in the vehicle on an inclined road surface in accordance with both the primary information and secondary information when the actual state and the assumed state match; and
cancel the hill-hold function in accordance with the primary information but not the secondary information when the actual state and the assumed state do not match each other.

2. The control system according to claim 1, wherein
the electronic controller is further configured to determine that the actual state and the assumed state do not match each other in the case where the secondary information indicates that a disconnected state of the clutch continues for a prescribed time.

3. The control system according to claim 1, wherein
the electronic controller is further configured to determine that the actual state and the assumed state do not match each other in the case where the secondary information indicates that chattering of the clutch continuously occurs in a prescribed cycle.

4. The control system according to claim 1, wherein
the electronic controller is further configured to determine whether the actual state and the assumed state match each other by taking an aggregate result of the secondary information into consideration.

5. A brake control method for executing brake control for a vehicle, the control method comprising:
receiving primary information from a first sensor, the primary information relating to an operation of an accelerator of the vehicle;
receiving secondary information from a second sensor, the secondary information indicating an assumed state related to connection and disconnection of a clutch in the vehicle;
determining, via an electronic controller, whether an actual state, which is related to the connection and the disconnection of the clutch, and the assumed state match each other in accordance with a temporal change in the secondary information;

cancelling, via the electronic controller, a hill-hold function for retaining a brake force generated in the vehicle on an inclined road surface in accordance with both the primary information and secondary information when the actual state and the assumed state match; and
cancelling, via the electronic controller, the hill-hold function in accordance with the primary information but not the secondary information when it is determined that the actual state and the assumed state do not match each other.

* * * * *